E. K. BAKER.
SELF ALINING TRANSPLIT RIM.
APPLICATION FILED APR. 3, 1916.
1,244,014.
Patented Oct. 23, 1917.
2 SHEETS—SHEET 2.
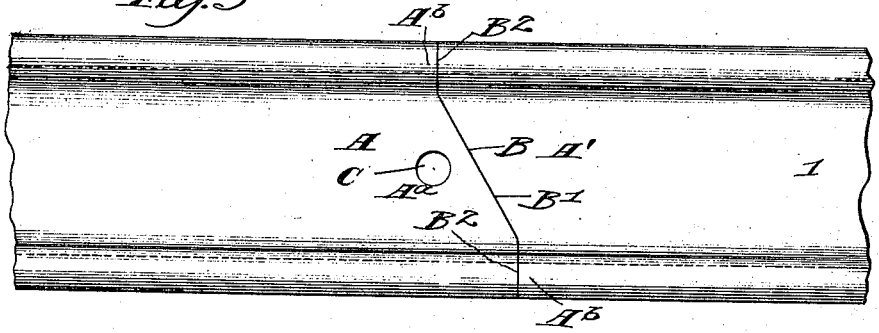
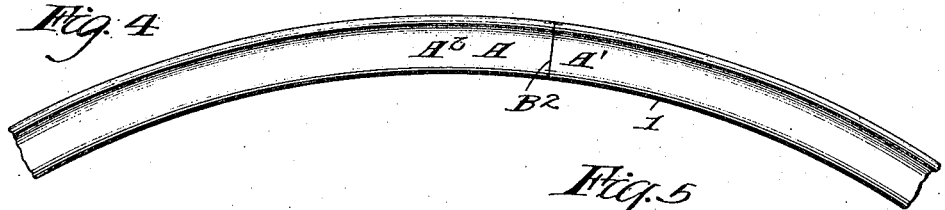
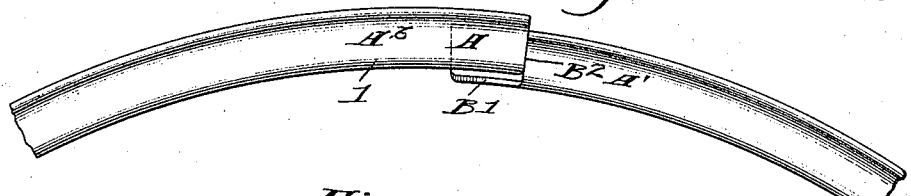
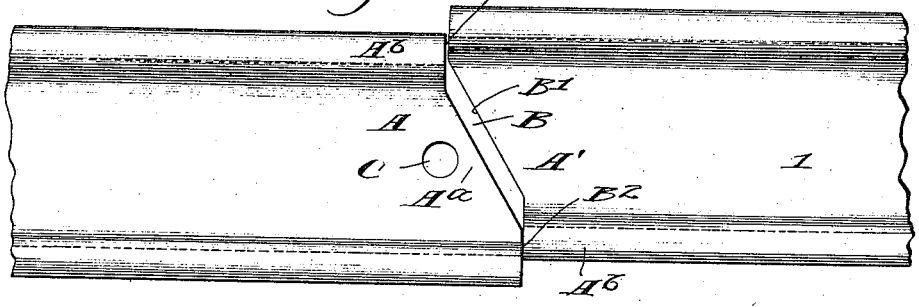
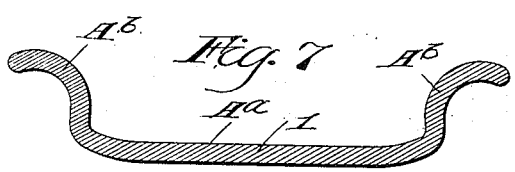
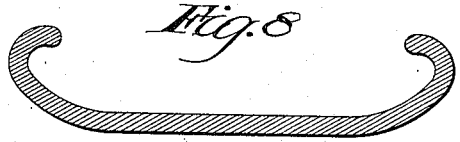
Witness:
Inventor:
Eric K. Baker.

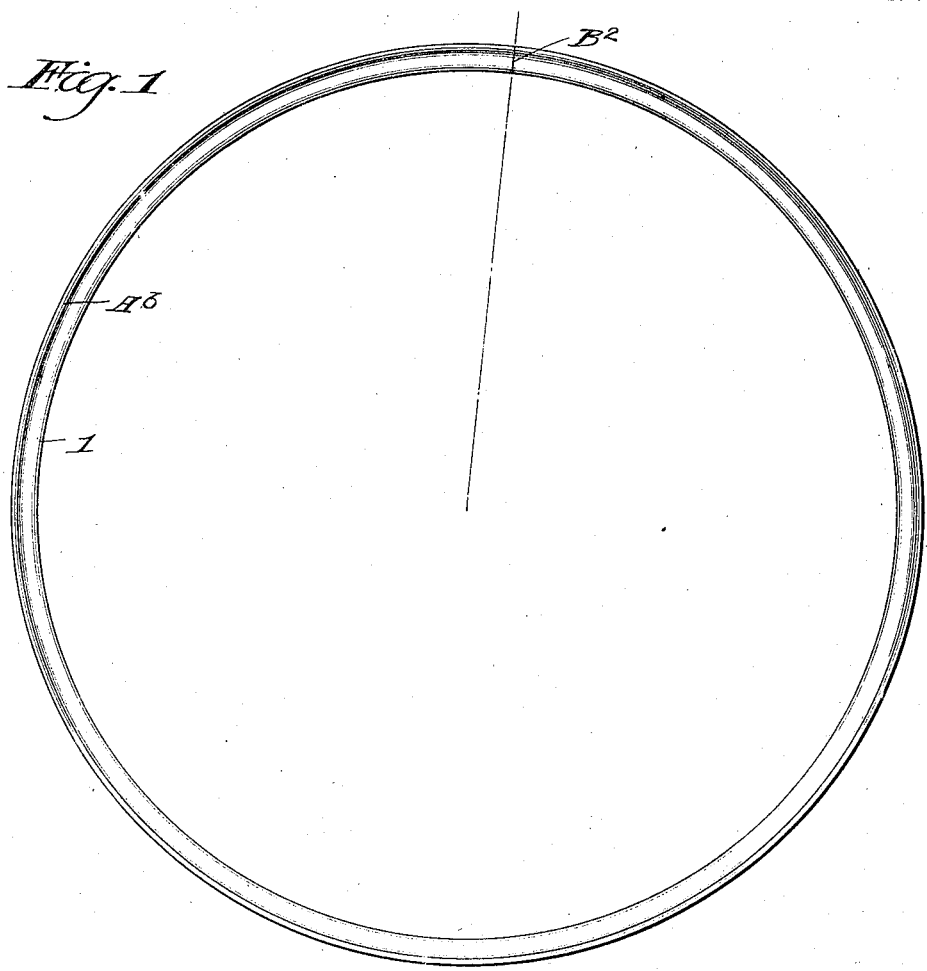
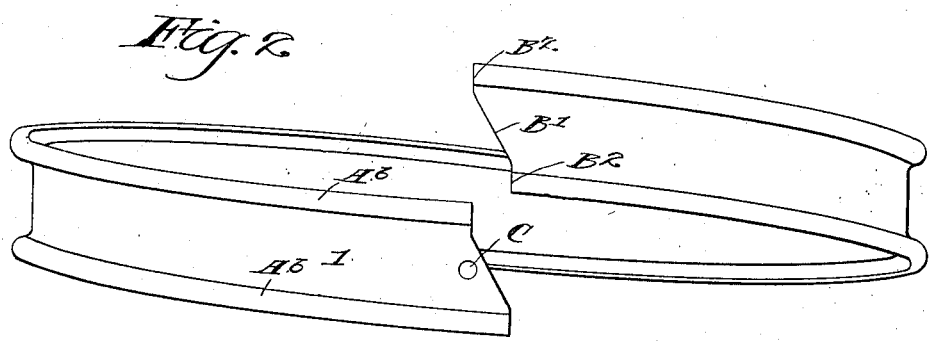

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

SELF-ALINING TRANSPLIT RIM.

1,244,014.         Specification of Letters Patent.      Patented Oct. 23, 1917.

Application filed April 3, 1916. Serial No. 88,668.

*To all whom it may concern:*

Be it known that I, ERLE KING BAKER, a citizen of the United States, and residing at Chicago, Cook county, Illinois, have invented certain new and useful Improvements in Self-Alining Transplit Rims, of which the following is a specification.

My invention relates to improvements in tire-carrying demountable rims for motor vehicle wheels. The subject matter hereof is a novel diagonally transplit rim having rim-ends which are self-alining and self-holding under the pressure of an inflated tire.

The invention will be readily understood on reference to the drawings that form part of this specification, in which:—Figure 1 is a side view of an integrally flanged, tire-carrying, demountable rim, embodying my invention;— Fig. 2 is a plan view showing the rim-ends laterally separated, as when the rim is being helically attached to or detached from the base beads of a pneumatic tire;— Fig. 3 is an enlarged plan view of the transplit portion of the rim showing the rim-ends in self-alined abutting condition;— Fig. 4 is a side view of the parts shown in Fig. 3;— Fig. 5 is a like side view, and illustrates the first action of separating the rim-ends and likewise the last part of the operation of placing them in alinement;— Fig. 6 is a plan view, taken from Fig. 5;— and Figs. 7 and 8 are cross sections, which disclose the fact that while the rim is of the integrally flanged transplit type, its cross sectional form may be varied as required to fit tires of different cross sections.

Referring to the drawings, 1 represents a demountable rim characterized by integral tire holding flanges. The rim is transversely split at one point only in its circumference. The purpose of splitting the rim in this way is to make it possible readily to place the rim within, and remove it from, the tire (not shown). These operations are described in Letters Patent No. 1,095,778 and No. 1,095,996, and are so well understood by motor car users, that I deem it unnecessary to further describe the same.

The novel form of the transverse split or cut in the rim appears in Figs. 1 to 6 of the drawings, and is fully disclosed in Figs. 2, 3, and 6. It is of the kind which extends from a point on one edge of the rim to a circumferentially advanced point on the other edge thereof. In other words, the split is generally diagonal, whereby the rim ends are made readily separable in transverse directions, as required to permit the rim most easily to be helically applied to and withdrawn from the base beads of the tire. It differs from the forms shown in aforesaid patents, inasmuch as the diagonal cut does not extend uninterruptedly from point to point on opposite flanges, but instead is intercepted by minor cuts in the flanges and which are perpendicular to said flanges; whereby the rim ends, A and A′, are provided with perpendicular abutting portions which cause them to be self-alining and self-holding under the pressure of a tire. But, at the same time, the diagonality of the cut, considered as a whole, is amply sufficient to permit the rim ends to be separated laterally one from the other, when the rim is being placed in and taken from a tire.

The form of the split, and of the resulting rim-ends, here described, is disclosed by the operatively diagonal line, B, in Fig. 3, which shows the rim ends in alined abutment. With more particularity, the split should be described as a major part, or diagonal proper, which extends substantially from flange to flange of the rim, plus two minor parts which are perpendicular to said flanges. The major and the minor parts or lines of the split are separately indicated by the marks, $B^1$ and $B^2$, in Fig. 3. It will be noted that the part, $B^1$, extends substantially across the body portion, $A^a$, of the rim, starting substantially at one flange, $A^b$, and extending to a corresponding point adjacent the other flange, $A^b$, of the rim. The minor parts or lines, $B^2$, are relatively reversed, but otherwise symmetrical.

I prefer that the cut, B, shall be made by shearing the rim, or by sawing the same, and at the middle point the plane of the cut should include a radius of the rim. Thus formed, the ends do not materially overlap circumferentially, and hence are more easy of separation, while being sufficiently self-holding when the ends are in abutment and under pressure.

Thus formed, the rim-ends, A and A′, become self-alining against the collapsing pressure of the tire thereon; and it is not necessary to provide other means for holding the ends in alinement while the rim carries an inflated spare tire. At the same time the now well known merits of the diagonal split are preserved. Slight radial separation of the rim-ends, (in the manner shown in Figs. 5 and 6), frees them, so that they may be fully separated, as shown in Fig. 2.

I call special attention to the fact that when relieved from compressive restraint, the rim ends may be separated radially without first being separated circumferentially. By very slight modification in the inclination of the split, the necessity for circumferential separation of the rim ends may be restored; but I know of no condition in modern practice which makes such separation desirable. Indeed, as tires and rims are now proportioned, little, if any, circumferential separation is possible while the rim is in position on the inextensible beads or flanges of a straight side or Q. D. pneumatic tire.

In actual practice I prefer to place the valve stem hole, C, in the rim end, A, at a point so close to the split, B, that the spreader of the valve stem (not shown) may cover the part of the split which would otherwise be exposed within the tire.

This present invention is not concerned with any special rim end connecting means or with any special rim mounting devices, and I have made no attempt to show such parts or devices in the drawings.

Several modifications of my invention will readily suggest themselves to one who is skilled in the art, and therefore I do not limit or restrict the invention to the precise construction shown and described, except as specifically pointed out in the appended claims.

Having thus described my invention, I claim as new and desire to secure by Letters Patent:—

1. A transplit, integrally flanged, demountable, tire-holding rim having self-alining and laterally separable rim ends, formed by transplitting the rim upon a major diagonal line and two minor lines which converge with opposite ends thereof.

2. A transplit, integrally flanged, demountable tire-holding rim having self-alining and laterally separable rim ends, formed by transplitting the rim upon a major diagonal line and two minor lines which are perpendicular to respective flanges of the rim and meet opposite ends of said diagonal line.

3. A transplit, integrally flanged, demountable, tire-holding rim having self-alining and laterally separable rim ends formed by transplitting the rim upon a major diagonal line and two minor lines which converge therewith adjacent respective flanges of the rim, one of the rim ends containing a valve stem hole closely adjacent the major diagonal line of the spilt.

4. A transplit, integrally flanged, demountable, tire-holding rim having self-alining and laterally separable rim ends formed by transplitting the rim upon a major diagonal line and two minor lines which are perpendicular to respective flanges of the rim.

5. A transplit, integrally flanged, demountable, tire-holding rim having self-alining and laterally separable rim ends formed by transplitting the rim upon a major diagonal line and two minor lines the latter of which extend through respective flanges of the rim.

In testimony whereof I have hereunto set my hand this 1st day of April, 1916.

ERLE KING BAKER.